United States Patent [19]
Gay, Jr.

[11] 3,928,925
[45] Dec. 30, 1975

[54] METHOD AND MEANS FOR PRODUCING STEREOSCOPIC CONTOUR MAPS

[76] Inventor: Sylvester Parker Gay, Jr., 1941 South 13th East, Salt Lake City, Utah 84108

[22] Filed: Sept. 13, 1971

[21] Appl. No.: 179,846

Related U.S. Application Data

[63] Continuation of Ser. No. 841,790, July 15, 1969, abandoned.

[52] U.S. Cl.................... 35/40; 281/1 R; 35/26
[51] Int. Cl.²........................................ G09B 25/06
[58] Field of Search............... 35/40, 41, 26; 282/1; 350/130; 33/20

[56] References Cited
UNITED STATES PATENTS
2,587,585  3/1952  Ayres.................. 35/26 X FOREIGN PATENTS OR APPLICATIONS
85,090  5/1920  Switzerland............. 35/41

Primary Examiner—Jerome Schnall
Attorney, Agent, or Firm—Gerald J. Ferguson, Jr.; Joseph J. Baker

[57] ABSTRACT

A method and means for producing stereoscopic contour maps by tracing the contour lines from a map sheet onto a pair of copy sheets placed in face-to-face relationship beneath the original map sheet, with interposed carbon paper or other transfer medium. Shifting of two of the sheets, usually the top copy sheet and the map sheet, relative to the other and to each other after the tracing of each contour line, to establish an offset for the next contour line, results in a stereoscopic pair of contour maps corresponding to left and right views, respectively, and made up of corresponding contour lines that are exact duplicates of each other.

5 Claims, 6 Drawing Figures

FIG. 1.

INVENTOR.
SYLVESTER PARKER GAY, Jr.

BY
ATTORNEYS

INVENTOR.
SYLVESTER PARKER GAY, Jr.
BY
ATTORNEYS

METHOD AND MEANS FOR PRODUCING STEREOSCOPIC CONTOUR MAPS

This is a continuation of application Ser. No. 841,790 filed July 15, 1969, now abandoned.

BACKGROUND OF THE INVENTION

Field:

The invention is concerned with the production of stereoscopic pairs of images for stereoscopic viewing to provide three-dimensional visual representations, particularly contour or relief maps useful in geological and geophysical exploration, but also any other type of contour map.

Objectives:

In the making of the invention, principal objectives were to enable stereoscopic pairs of contour maps to be produced simultaneously and with assurance that each map of the resulting pair will have the exact counterpart of each of the contour lines of the original, so that the stereoscopic image will be free of undesirable distortion.

State of the Art:

Heretofore, stereoscopic contour maps have been produced from a conventional contour map by making a left offset trace on one sheet and by then making a right offset trace on a second sheet, or vice versa. This has led to distortions in the resulting stereoscopic view by reason of inadvertent or unavoidable deviations between the images of the left offset and the right offset traces. Although stereoscopic maps of single sheet form have been produced with offsets in different colored inks by means of manual or computer techniques, these tend to suffer similar inadvertent or unavoidable deviations in the paired, differently colored, contour lines.

SUMMARY OF THE INVENTION

In accordance with the present invention, individual images making up a stereoscopic pair of images are reproduced simultaneously on respective copy sheets by tracing contour lines from a conventional contour map onto two copy sheets placed in face-to-face relationship under the original map sheet, with impression transfer means such as carbon paper interposed between the sheets. At least one of the copy sheets, preferably the upper one, is shifted sidewardly relative to the other after tracing each contour line and in preparation for tracing the next contour line, so as to produce a stereoscopic pair of contour maps made up of corresponding contour lines that are exact duplicates of each other. The method is best accomplished by the use of specially prepared copy sheets and a specially prepared map sheet to be copied.

The several sheets are special in that there are provided means for insuring exact registration of the sheets with respect to common vertical and horizontal axes, as well as contour scale means for controlling the extent of shifting. The contour scale means advantageously take the form of numbered scales of contour values extending along the horizontal axes of the sheets and transversely across the vertical axes within respective viewing areas at both top and bottom of the lower copy sheet. Windows are advantageously provided in the map sheet and the upper copy sheet at locations overlying the viewing areas.

THE DRAWINGS

FIG. 1 is a top plan view of assembled copy and contour map sheets constituting means presently contemplated as the best mode of carrying out the invention;

FIG. 2, a transverse vertical section taken on the line 2—2 of FIG. 1;

FIG. 3, a corresponding view after the upper copy sheet and the superimposed original map sheet have been shifted to the right;

FIG. 4, a top plan view of the original contour map sheet;

FIG. 5, a top plan view of the upper copy sheet; and

FIG. 6, a top plan view of the lower copy sheet.

DETAILED DESCRIPTION OF THE ILLUSTRATED EMBODIMENT

Figure 2:
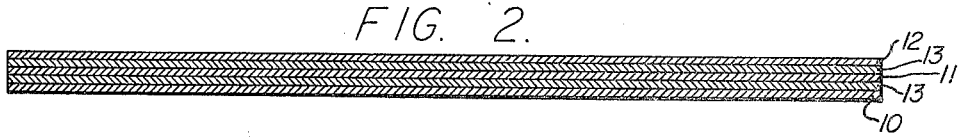
Figure 6:
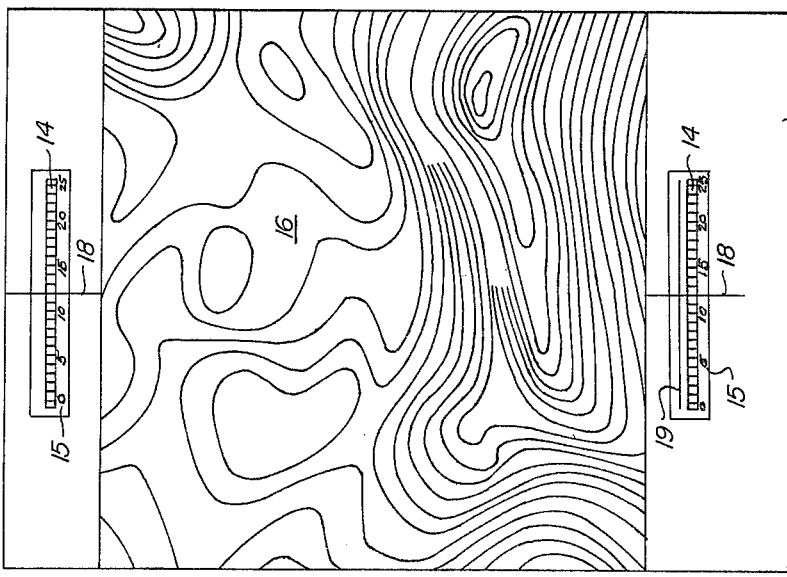
Figure 5:
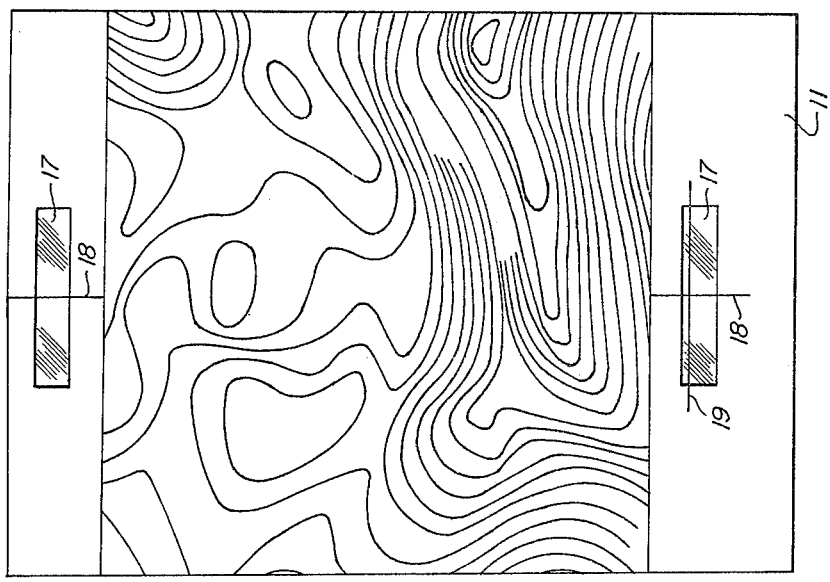
Figure 4:
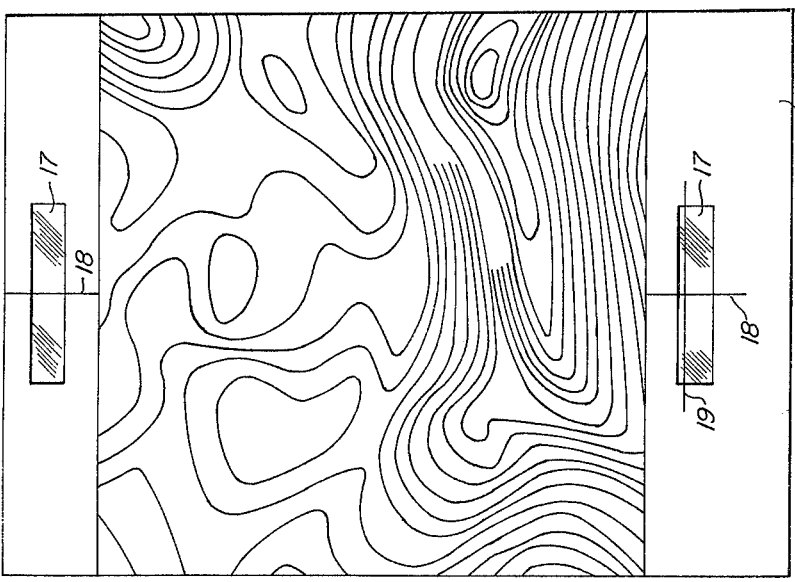

In the particular form illustrated, the means for carrying out the method of the invention comprises a lower copy sheet 10, FIG. 6, with a sheet of carbon paper 13, face down, affixed to it; an upper copy sheet 11, FIG. 5, with a sheet of carbon paper 13, face down, affixed to it; and a contour map sheet 12, FIG. 4. The three sheets are adapted to be assembled in face-to-face relationship, as indicated in FIG. 2.

As is customary, the individual contour lines of the contour map represent contour values in terms of, for example, vertical height, force of gravity, or magnetic intensity, such contour values usually increasing or decreasing by even intervals. The contour values of individual contour lines are normally marked on the contour map.

Although ordinary carbon paper is convenient to use as impression transfer means between the sheets, other transfer means can be employed. For example, the upper copy sheet 11 and the original map sheet 12 can be made of impregnated paper constituting combined marking and transfer sheets.

Figure 1:
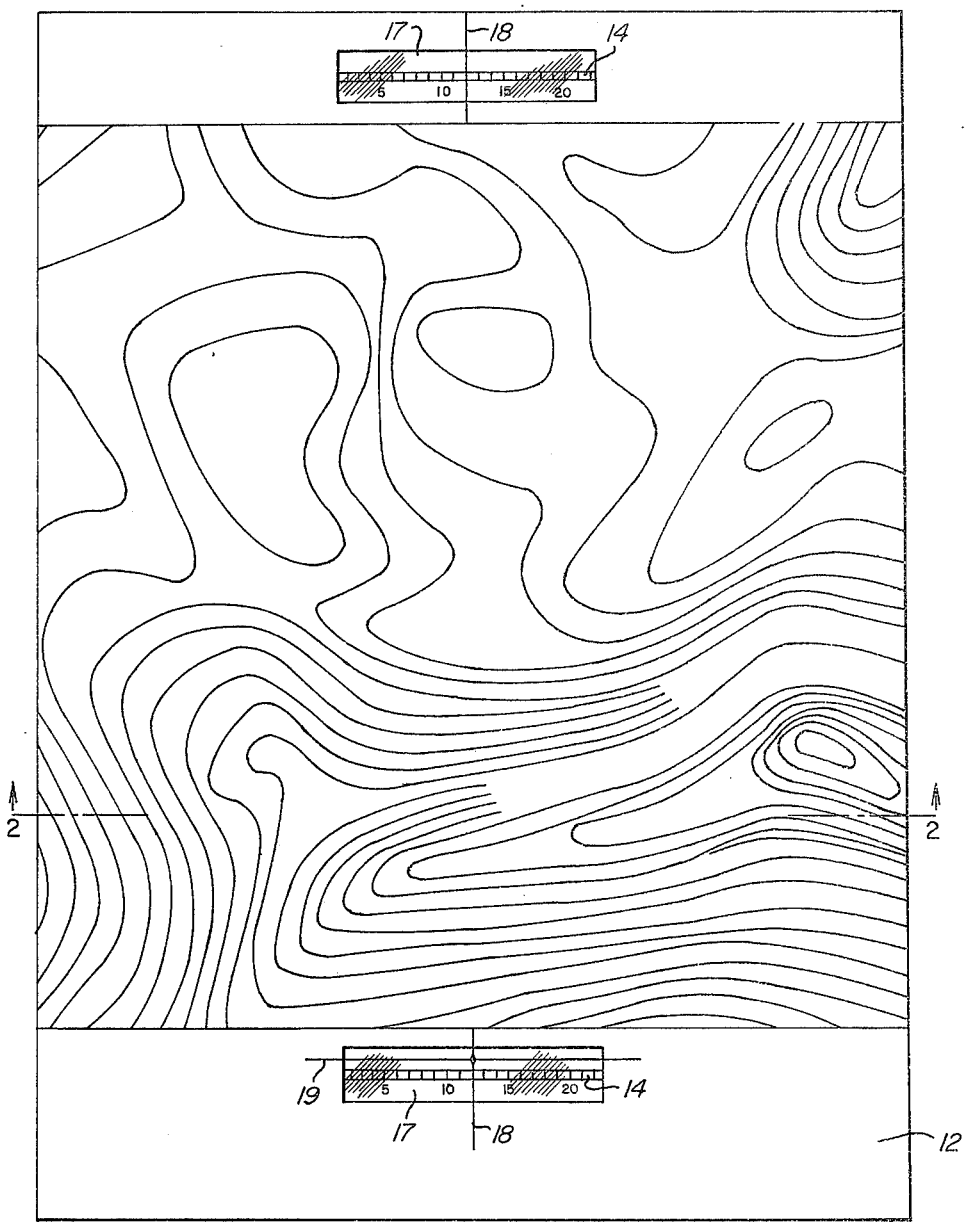

The lower copy sheet 10 is provided with contour scales 14 at top and bottom thereof within respective viewing areas 15, leaving space 16 therebetween for receiving a tracing of the contour lines of the contour map 12. Both the upper copy sheet 11 and the contour map sheet 12 carry transparent windows 17, or other transparent means, at locations adapted to overlie the viewing areas 15, so a person tracing over the map 12 when the sheets are assembled as in FIG. 1 will be able to see the contour scales 14.

The contour scales are each related to the contour values on some predetermined basis, that is to say each division of the scale may represent one or a fractional part of one interval on the map. These divisions are usually fractional parts of an inch, for example 1/50th, 1/60th, 1/100th.

All three sheets advantageously carry reference markings establishing vertical axes 18 and horizontal axes 19 in mutually correlated positions within the viewing areas. Thus, in the illustrated form, vertical reference axes 18 and horizontal axes 19 are marked over the contour scale 14 at the bottom of the lower copy sheet 10, and similar axes are marked over the lower windows 17 of the upper copy sheet and the original map sheet. Similar vertical axes are marked over the upper area 15 and windows 17.

In the preferred practice of the method, the lower copy sheet 10 is fastened to a drawing board (not shown) or similar flat surface, so that it remains fixed during the entire operation. The upper copy sheet 11 is superimposed on it, with its horizontal axis markings 19 in registry with those of the lower copy sheet and its vertical axes 18 overlying some specific contour value on the contour scales 14. The map sheet 12 is superimposed on the thus assembled copy sheets, with its horizontal axis markings 19 in registry with those of the copy sheets, and its vertical axis 18 lying between the offset vertical axes of the lower copy sheet 10 and the upper copy sheet 11. Sheets 13 of carbon paper are interposed between the copy sheets and between the upper copy sheet and the map sheet in such a manner that the viewing areas 15 are left free.

The contour line of the original map 12 corresponding to the selected specific contour value is then traced as a starter. This is usually a contour line having a lower value. Thereupon, both the upper copy sheet 11 and the map sheet 12 in this instance are shifted to the right of the lower copy sheet 10 by respective distances that make the offsets of the two copy sheets, relative to the map sheet, equal. Although it is usually preferable to shift so that the two offset distances are equal, this is not necessary since satisfactory stereoscopic images are obtained when the offset distances are unequal in any ratio between zero and unity. In other words, the primary concern of the invention is to obtain identical but mutually offset traces of the individual contour lines of a contour map on two copy sheets that can thereafter be used to produce a stereoscopic image of the contour map.

Figure 3:

Shifting is preferably accomplished by moving the upper copy sheet 11 along the horizontal axis and to one side of the vertical axis by twice the desired offset distance and by then moving the map sheet similarly but by only half the distance the copy sheet is moved. As shown in FIG. 3, the two sheets 11 and 12 have been moved, i.e. shifted, to the right. The contour line lying next in the direction of shift to the first traced is then traced.

The sheets 11 and 12 are shifted and tracings are made similarly for successive contour lines constituting the remainder of the contour map.

It should be realized that the best mode presently contemplated, as described in detail above, is not the only mode of carrying out the invention.

I claim:

1. A method of producing a single stereoscopic pair of contour maps, comprising placing in face-to-face relationship a total of two copy sheets and an original contour map sheet with impression transfer means interposed between said sheets; tracing a selected contour line from said map sheet onto said copy sheets, so as to produce two identical and non-distorted tracings; shifting two of said sheets relative to the third and relative to each other by respective distances related to the contour value of the next contour line to be traced and tracing said next contour line on said map sheet, so as to produce a pair of identical and non-distorted, stereoscopically offset tracings on the respective copy sheets; and repeating the said shifting and tracing for additional contour lines of said map sheet wherein the copy and map sheets are shifted by respective distances that make equal offsets for the paired tracings on the two copy sheets relative to the corresponding contour line traced on the contour map sheet, each copy sheet and the contour map sheet being provided with reference markings at mutually corresponding locations, establishing both vertical and horizontal axes; a scale of contour values being provided at a location visible to a person tracing the contour lines of the contour map and correlated with the axis from which the sheets are shifted; and the sheets being shifted with reference to said markings and said scale of contour values.

2. A method according to claim 1, wherein the contour scale is carried by the lower copy sheet, and the upper copy sheet and the contour map sheet are shifted relative to said lower copy sheet.

3. A device for producing a single pair of stereoscopic relief maps, comprising a total of two copy sheets and a contour map sheet, each carrying reference markings at mutually corresponding locations establishing vertical and horizontal axes when the three are assembled in superimposed relationship, with one copy sheet superimposed on the other and the contour map sheet superimposed on the upper copy sheet; impression transfer means between said copy sheets and between the contour map sheet and the upper copy sheet; a scale of contour values at a location visible to a person tracing contour lines of the contour map sheet and correlated with said axes so as to enable two of said sheets to be moved predetermined distances from the vertical axis relative to the other sheet; and one of said sheets being adapted for affixing to a suitable base, so the other sheets can be shifted relative thereto and to each other and so that contour lines of said map sheet can be traced.

4. A device according to claim 3, wherein the scale of contour values is carried by the lower copy sheet; and transparent areas are provided in the upper copy sheet and the map sheet in overlying relationship with said scale, the reference axis markings being located on or adjacent to said scale and within said transparent areas.

5. A device according to claim 4, wherein there is a scale at each of opposite ends of the lower copy sheet and a transparent area at each of opposite ends of both the upper copy sheet and the map sheet.

* * * * *